(12) United States Patent
Arcilla et al.

(10) Patent No.: US 9,612,812 B2
(45) Date of Patent: Apr. 4, 2017

(54) METHOD AND SYSTEM FOR DISTRIBUTED APPLICATION STACK TEST CERTIFICATION

(75) Inventors: Andre Arcilla, San Jose, CA (US); Konstantin Boudnik, Castro Valley, CA (US); Roman V. Shaposhnik, Sunnyvale, CA (US)

(73) Assignee: EXCALIBUR IP, LLC, Sunnyvale, CA (US)

( * ) Notice: Subject to any disclaimer, the term of this patent is extended or adjusted under 35 U.S.C. 154(b) by 770 days.

(21) Appl. No.: 13/332,435

(22) Filed: Dec. 21, 2011

(65) Prior Publication Data

US 2013/0167139 A1 Jun. 27, 2013

(51) Int. Cl.
*G06F 9/445* (2006.01)
*G06F 21/57* (2013.01)

(52) U.S. Cl.
CPC ............ *G06F 8/60* (2013.01); *G06F 9/44505* (2013.01); *G06F 21/57* (2013.01)

(58) Field of Classification Search
CPC ..... G06F 8/20; G06F 8/30; G06F 8/36; G06F 8/60; G06F 8/61; G06F 8/63; G06F 8/65; G06F 8/66; G06F 8/71; G06F 9/44505; G06F 9/44521; G06F 11/362; G06F 11/3664; G06F 11/3672; G06F 11/3684; G06F 11/3688; G06Q 10/10
USPC ................................. 717/120–122, 124, 175
See application file for complete search history.

(56) References Cited

U.S. PATENT DOCUMENTS

| | | | | |
|---|---|---|---|---|
| 7,051,243 B2* | 5/2006 | Helgren et al. | ................ | 714/48 |
| 7,150,015 B2* | 12/2006 | Pace et al. | ..................... | 717/176 |
| 7,454,659 B1* | 11/2008 | Gaudette | ............ | G06F 11/3664 714/33 |
| 7,624,377 B2* | 11/2009 | Wu | .............................. | 717/121 |
| 7,788,536 B1* | 8/2010 | Qureshi et al. | ............ | 714/38.14 |
| 7,840,854 B2* | 11/2010 | Zhou | ........................... | 714/47.1 |
| 8,010,777 B2* | 8/2011 | Nandan et al. | ............... | 713/100 |

(Continued)

OTHER PUBLICATIONS

Konstantinou et al., IBM Research, "An Architecture for Virtual Solution Composition and Deployment in Infrastructure Clouds," VTDC'09, Jun. 15, 2009, last retrieved from http://www.cs.nyu.edu/~totok/professional/papers/vtdc09.pdf on Nov. 13, 2016.*

(Continued)

*Primary Examiner* — Wei Zhen
*Assistant Examiner* — Andrew M Lyons
(74) *Attorney, Agent, or Firm* — Pillsbury Winthrop Shaw Pittman LLP

(57) ABSTRACT

Method, system, and programs for automatically certifying a configuration of a distributed application stack to be deployed on a cluster. A request is first received to certify the configuration of the distributed application stack to be deployed on the cluster based on a baseline configuration of the distributed application stack. The configuration of the distributed application stack includes a version of each of the plurality of software artifacts. Based on the configuration in the request, the distributed application stack is then deployed on the cluster. A record is received from each node of the cluster indicating a status during the deployment and/or a result after the deployment for the respective node. Based on the received records, a certification record is then created for the configuration in the request.

23 Claims, 17 Drawing Sheets

(56) References Cited

U.S. PATENT DOCUMENTS

| | | | |
|---|---|---|---|
| 8,156,485 B2* | 4/2012 | Jordan et al. | 717/168 |
| 8,732,693 B2* | 5/2014 | Mutisya et al. | 717/176 |
| 2007/0038679 A1* | 2/2007 | Ramkumar | H04L 41/082 |
| 2007/0288903 A1* | 12/2007 | Manglik | G06F 8/60 |
| | | | 717/124 |
| 2008/0114860 A1* | 5/2008 | Keys | G06F 8/61 |
| | | | 709/219 |
| 2008/0141240 A1* | 6/2008 | Uthe | 717/174 |
| 2008/0163194 A1* | 7/2008 | Dias | G06F 9/5077 |
| | | | 717/174 |
| 2009/0070771 A1* | 3/2009 | Yuyitung | G06Q 10/06 |
| | | | 718/105 |
| 2009/0187894 A1* | 7/2009 | Bell et al. | 717/127 |
| 2009/0300580 A1* | 12/2009 | Heyhoe et al. | 717/106 |
| 2010/0162233 A1* | 6/2010 | Ku et al. | 717/178 |
| 2011/0239214 A1* | 9/2011 | Frields et al. | 718/1 |

OTHER PUBLICATIONS

McLay et al., "Best Practices for the Deployment and Management of Production HPC Clusters," SC'11, Nov. 12-18, 2011.*
Microsoft, "Failover Cluster Step-by-Step Guide: Validating Hardware for a Failover Cluster," TechNet, Apr. 14, 2010, last retrieved from https://technet.microsoft.com/en-us/library/cc732035(v=ws.10).aspx on Nov. 13, 2016.*

\* cited by examiner

Exemplary Request Queue

Hadoop Certification Queue

| # | Date | Baseline | Deviations | Test Results | Certified | Certification Record | Notes |
|---|---|---|---|---|---|---|---|
| 01 | 04/29/2011 | Fred | none | results | no | N/A | Some tests failed |
| 02 | 04/29/2011 | Fred | Pig 0.9 Bug 12345 | results | no | N/A | Some tests failed |
| 03 | 05/20/2011 | Fred | none | results | yes | Certification Record 0001 | |

Fig. 9 (a)

Exemplary Baseline Configuration

Baseline Hadoop Fred Snapshot

Snapshot date: Fri Apr 29 18:16:28 PDT 2011

| # | Component | Package Version |
|---|---|---|
| 01 | Hadoop Fred | hadoop-0.20.203.3.1104221543 |
| 02 | Hadoop Fred | hadoopaudit-0.20.203.0.1104271329 |
| 03 | Hadoop Fred | hadoopviewfs-0.20.203.1102110410 |
| 04 | Hadoop Fred | gridjdk-1.6.0_21.1011192346 |
| 05 | Hadoop Fred | gridjdk64-1.6.0_21.1011192346 |
| 06 | Hadoop Fred | HadoopConfiggeneric10nodeblue-0.20.203.0.1104271329 |
| 07 | Hadoop Fred | HadoopConfiggeneric10node12diskblue-0.20.203.0.1104271329 |
| 08 | DAQ | Daq-0.1.1104262128 |
| 09 | Distcp | ygrid_hadoop_distcp-0.1.1011250802 |
| 10 | HCat | hcat_client-0.1.0.03251547 |
| 11 | HCat | hcat_server-0.1.0.03251547 |
| 12 | HDFS Proxy | ygrid_hdfsproxy_hit-3.0.0.0.1104072227 |
| 13 | Hive | hive_cli-0.0.7_6 |
| 14 | Hive | hive_server-0.0.7_6 |
| 15 | Log Collector | ygrid_hadoop_log_collector-0.1.1010231503 |

Fig. 9 (b)

Exemplary Certification Record

Certification Record 0001

Certification date: Thu May 19 17:04:54 PDT 2011

Test Results

- Hadoop core: 0 pass, 0 fail
- DAQ: 2 pass, 1 fail
- Distcp: 27 pass, 0 fail
- HCat: 10 pass, 0 fail
- HDFS Proxy: 203 pass, 0 fail
- Hive: 11 pass, 0 fail
- Log Collector: 2 pass, 0 fail
- Nova: 15 pass, 0 fail
- Oozie: 0 pass, 0 fail
- Pig: 28 pass, 0 fail
- Vaidya: 1 pass, 0 fail

Cluster Configuration - hit2 (20 nodes)

Hide

- Namenode(s): gsbl90949.blue.ygrid.yahoo.com
- Secondary: gsbl90947.blue.ygrid.yahoo.com
- Job Tracker: gsbl90948.blue.ygrid.yahoo.com
- Gateway: gwbl2005.blue.ygrid.yahoo.com
- DAQ: gsbl90936.blue.ygrid.yahoo.com
- HCat: gsbl90935.blue.ygrid.yahoo.com
- HDFS Proxy: gsbl90933.blue.ygrid.yahoo.com
- Oozie: gsbl90934.blue.ygrid.yahoo.com
- Datanodes
  - gsbl90930.blue.ygrid.yahoo.com
  - gsbl90931.blue.ygrid.yahoo.com
  - gsbl90932.blue.ygrid.yahoo.com
  - gsbl90937.blue.ygrid.yahoo.com
  - gsbl90938.blue.ygrid.yahoo.com
  - gsbl90939.blue.ygrid.yahoo.com
  - gsbl90940.blue.ygrid.yahoo.com
  - gsbl90941.blue.ygrid.yahoo.com
  - gsbl90942.blue.ygrid.yahoo.com
  - gsbl90943.blue.ygrid.yahoo.com
  - gsbl90944.blue.ygrid.yahoo.com
  - gsbl90945.blue.ygrid.yahoo.com
  - gsbl90946.blue.ygrid.yahoo.com

Fig. 9 (c)

Exemplary Software Artifact Version Change Table

| Request Date | Artifact Name | Old Version | New Version | Requestor |
|---|---|---|---|---|

Fig. 9 (d)

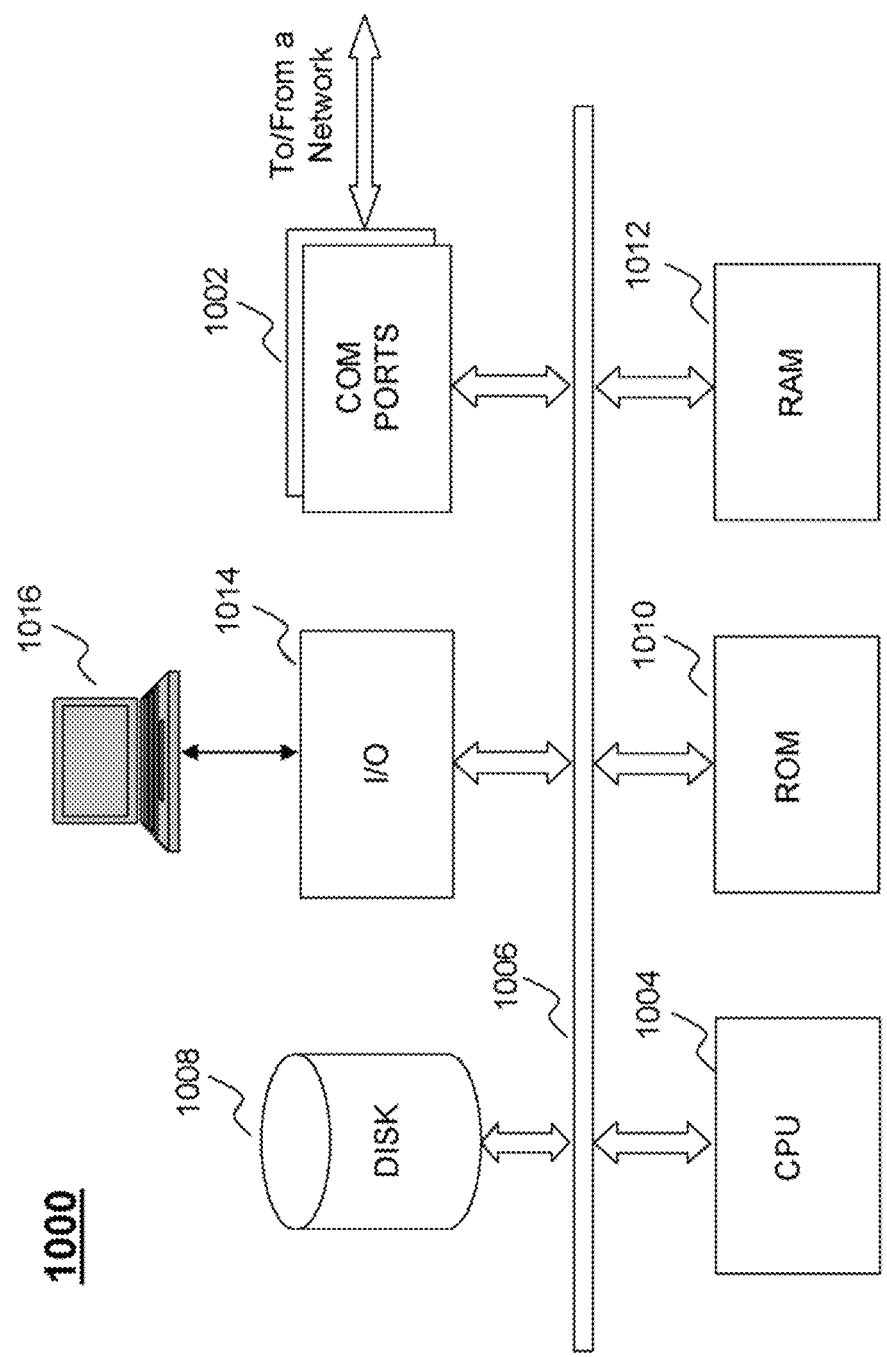

METHOD AND SYSTEM FOR DISTRIBUTED APPLICATION STACK TEST CERTIFICATION

BACKGROUND

1. Technical Field

The present teaching relates to methods, systems, and programming for distributed computing. Particularly, the present teaching is directed to methods, systems, and programming for distributed application stack test certification.

2. Discussion of Technical Background

Distributed computing is a field of computer science that studies distributed systems, which include multiple autonomous computers or parallel virtual machines that communicate through a computer network, such as a computer cluster having multiple nodes. The machines in a distributed system interact with each other in order to achieve a common goal. A computer program that runs in the distributed system is called a distributed application. In distributed computing, a problem is divided into many tasks, each of which is solved by one or more computers, such as the nodes of a computer cluster. Distributed systems and applications may be applied as various paradigms, including grid computing, utility computing, edge computing, and cloud computing by which users may access the server resources using a computer, netbook, tablet, smart phone, game console, set-top box, or other device through the Internet.

For instance, APACHE HADOOP is a software framework that supports data-intensive distributed applications under a free license. It enables applications to work with thousands of nodes and petabytes of data. Rather than rely on hardware to deliver high-availability, HADOOP is designed to detect and handle failures at the application layer, thereby delivering a highly-available service. HADOOP is deployed on a computer cluster in the form of a HADOOP stack, which includes a set of software artifacts (HADOOP components), such as HADOOP software, configuration files, libraries, links, source code, documentations, miscellaneous, etc. The deployment of HADOOP on a cluster of machines usually involves hardware installation, operating system installation, update, and configuration, JAVA installation and configuration, and HADOOP stack installation, configuration, and diagnostic.

A distributed application stack may be configured in different ways by different users and deployed on different computer clusters. For example, a HADOOP stack may contain different software artifacts and each software artifact may have different versions to constitute different HADOOP configurations. Therefore, it is desired to certify a particular configuration to be deployed on a certain cluster in order to indicate whether the HADOOP stack in that configuration would work properly once deployed. However, currently, there is no easy way to ascertain that a particular set of versions comprising given HADOOP Stack deployment has been tested in a particular configuration for various reasons. For instance, not all HADOOP Stack artifacts are version controlled and recorded during and after the deployment; the hardware configuration on which a HADOOP Stack is deployed is not recorded; there is no record being kept of artifact version changes during certification or different versions of HADOOP Stack component being tested together.

Therefore, there is a need to provide a solution for automatically certifying a distributed application stack, such as the HADOOP stack, in a particular configuration, to be deployed on a certain cluster, such that the deployment and test results are fully tracked and recorded in a certification record, and the certification records are stored and published.

SUMMARY

The present teaching relates to methods, systems, and programming for distributed computing. Particularly, the present teaching is directed to methods, systems, and programming for distributed application stack test certification.

In one example, a method, implemented on at least one machine each of which has at least one processor, storage, and a communication platform connected to a network for automatically certifying a configuration of a distributed application stack to be deployed on a cluster. A request is first received to certify the configuration of the distributed application stack to be deployed on the cluster based on a baseline configuration of the distributed application stack. The configuration of the distributed application stack includes version of each of the plurality of software artifacts. Based on the configuration in the request, the distributed application stack is then deployed on the cluster. A record is received from each node of the cluster indicating a status during the deployment and/or a result after the deployment for the respective node. Based on the received records, a certification record is then created for the configuration in the request.

In a different example, a system for automatically certifying a configuration of a distributed application stack to be deployed on a cluster is presented, which includes a request handler, a deployment unit, a recording module, and a certification generator. The request handler is configured to receive a request to certify the configuration of the distributed application stack to be deployed on the cluster based on a baseline configuration of the distributed application stack. The configuration of the distributed application stack includes a version of each of the plurality of software artifacts. The deployment unit is operatively coupled to the request handler and is configured to deploy the distributed application stack on the cluster based on the configuration in the request. The recording module is configured to receive a record from each node of the cluster indicating a status during the deployment and/or a result after the deployment for the respective node. The certification generator is operatively coupled to the record unit and is configured to create a certification record for the configuration in the request based on the received records.

Other concepts relate to software for automatically certifying a distributed application stack including a plurality of software artifacts to be deployed on a cluster including a plurality of nodes. A software product, in accord with this concept, includes at least one machine-readable non-transitory medium and information carried by the medium. The information carried by the medium may be executable program code data regarding parameters in association with a request or operational parameters, such as information related to a user, a request, or a social group, etc.

In one example, a machine readable and non-transitory medium having information recorded thereon for certifying a configuration of a distributed application stack to be deployed on a cluster recorded thereon, wherein the information, when read by the machine, causes the machine to perform a series of steps. A request is first received to certify the configuration of the distributed application stack to be deployed on the cluster based on a baseline configuration of the distributed application stack. The configuration of the distributed application stack includes a version of each of the plurality of software artifacts. Based on the configuration in the request, the distributed application stack is then deployed on the cluster. A record is received from each node of the cluster indicating a status during the deployment and/or a result after the deployment for the respective node. Based on the received records, a certification record is then created for the configuration in the request.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIGS. 9(a)-9(d) show an exemplary request queue, an exemplary baseline configuration, an exemplary certification record, and an exemplary software artifact version change table, respectively, according to an embodiment of the present teaching; and FIG. 10 depicts a general computer architecture on which the present teaching can be implemented.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of distributed application stack test certification in a fully automated manner. The method and system as disclosed herein aim at eliminating manual interventions in distributed application stack test certification in order to make the certification more efficient and effective. Such method and system benefit users in several ways: for example, the certification of the distributed application stack is fully automated so that it does not contain human operator errors and is complete and permanently stored; the deployed versions of all the artifacts in the distributed application stack are fully identified and recorded; the certification record can serve as a tangible artifact that can be used as a proof of distributed application stack testing, e.g. provided in the deployment ticket, given to users; the certification record serves as a permanent record that a given distributed application stack was certified as a whole in a correct configuration on a correct cluster.

Figure 1A:
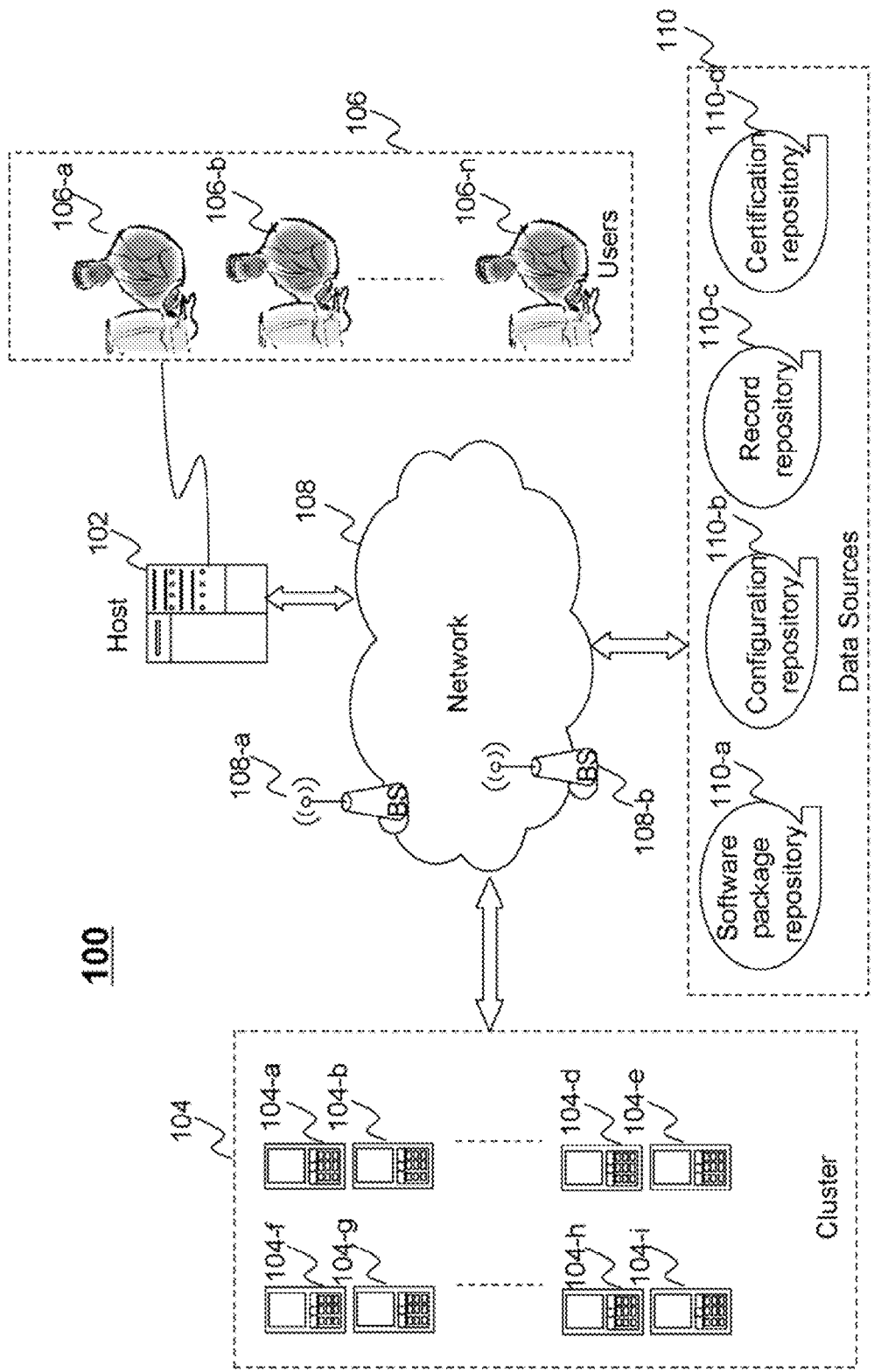
FIGS. 1(a)-1(c) depict exemplary embodiments of a networked environment in which distributed application stack test certification is applied, according to an embodiment of the present teaching.
Figure 1B:
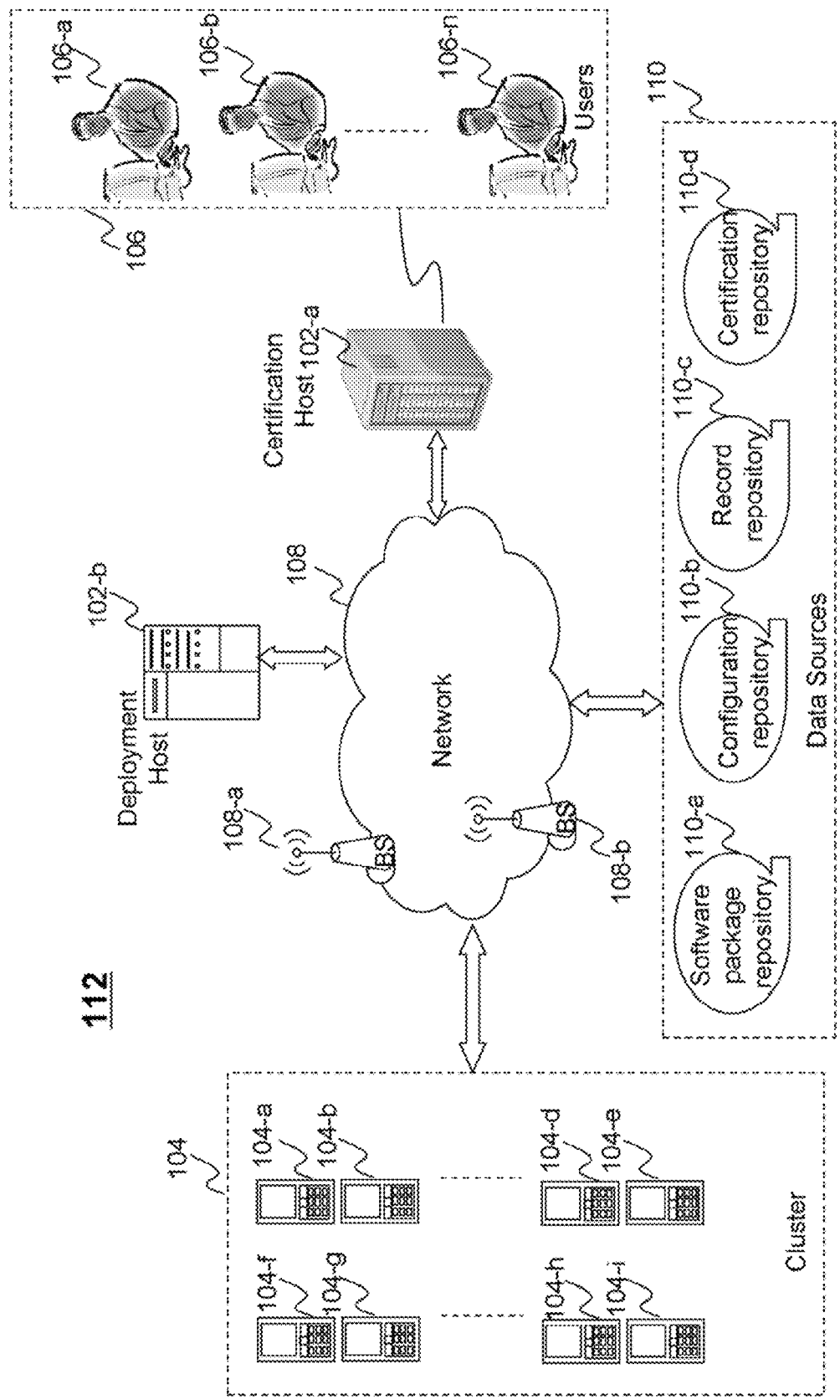
Figure 1C:
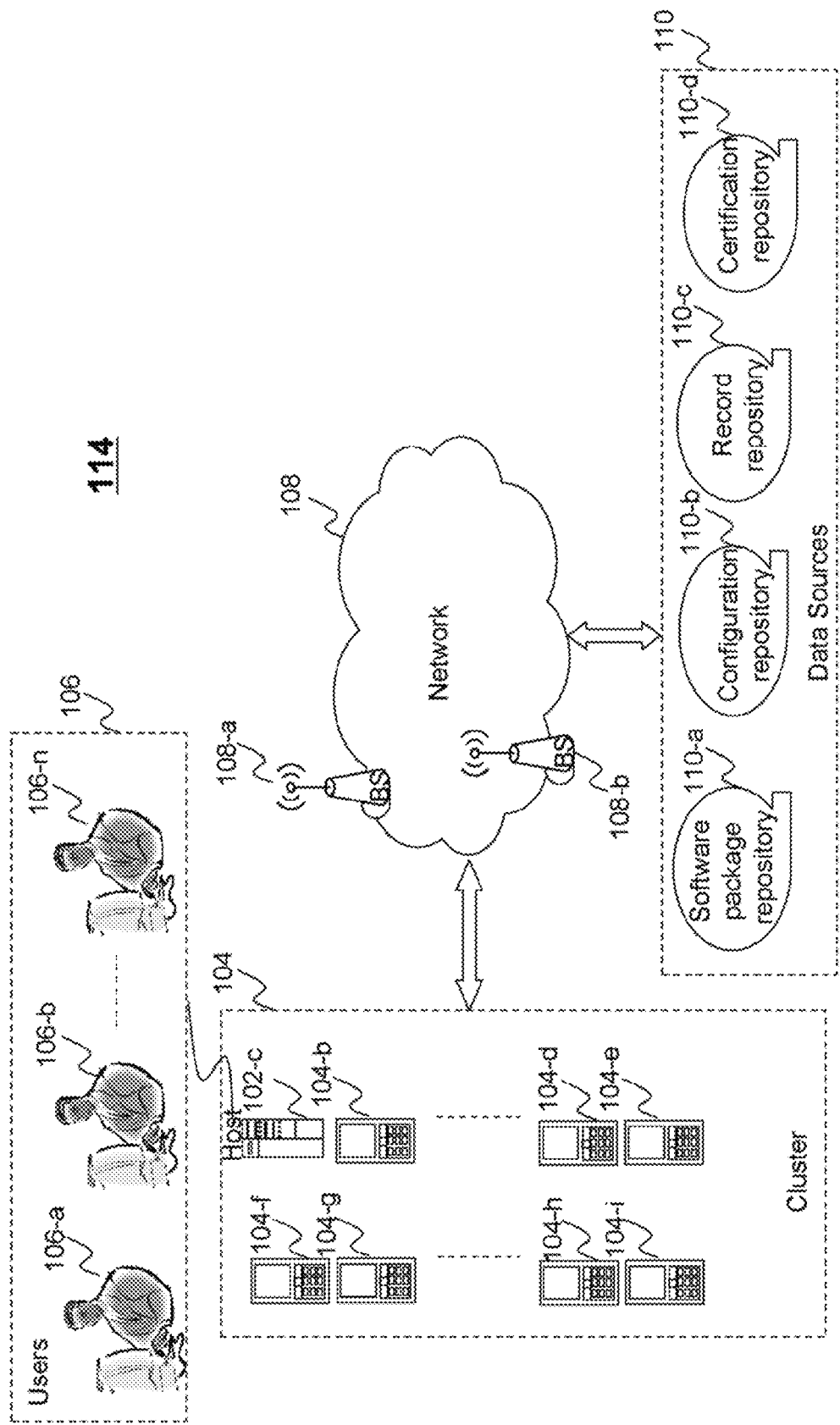

FIGS. 1(a)-1(c) depict high level exemplary system configurations in which a configuration of a distributed application stack to be deployed on a cluster can be automatically certified, according to an embodiment of the present teaching. In FIG. 1(a), the exemplary system 100 includes a host 102, a cluster 104, one or more users 106, a network 108, and data sources 110, including, for example, a software package repository 110-a, a configuration repository 110-b, a record repository 110-c, and a certification repository 110-d. The network 108 may be a single network or a combination of different networks. For example, the network 108 may be a local area network (LAN), a wide area network (WAN), a public network, a private network, a proprietary network, a Public Telephone Switched Network (PSTN), the Internet, a wireless network, a virtual network, or any combination thereof. The network 108 may also include various network access points, e.g., wired or wireless access points such as base stations or Internet exchange points 108-a, . . . , 108-b, through which a data source may connect to the network in order to transmit information via the network.

The cluster 104 in which the distributed application stack to be deployed and certified may include a plurality of nodes 104-a, 104-b, . . . 104-h, 104-i, which communicate through the network 108 or through an internal network (not shown). In this example, each node of the cluster 104 may be an autonomous physical machine, such as a server, a workstation, a desktop or laptop computer, a netbook, a tablet, a smart phone, a game console, a set-top box, or any other suitable machine. In another example, some or all of the nodes may be parallel virtual machines implemented by either software emulation or hardware virtualization. The cluster 104 may be a set of machines owned by one entity, e.g., an enterprise, and maintained as a server farm or server cluster where the servers are mounted on racks in a server room or data center. The cluster 104 may also be a collection of machines owned by different entities and that are physically separate from each other at a distance.

The data sources 110 include one or more databases on one or more servers for providing and storing information related to the distributed application stack deployment and certification. For example, the software package repository 110-a is a storage location from which software packages may be retrieved and installed on the machines of the cluster 104. The configuration repository 110-b may keep the configuration information necessary for the distributed application stack deployment and certification, including, for example, the version of each software artifact of the distributed application stack and the type of each node of the cluster 104, and baseline configurations for certification. The baseline configuration is a "special" configuration that is published or dispatched to the users 106 periodically or from time to time. The users 106 then may sign-off the baseline configuration and create their own configurations based on the baseline configuration, but have no control over the creation and modification of the baseline configuration. The record repository 110-c may include a database storing all the records related to the distributed application stack deployment and certification, including, for example, certification records of different configurations of the distributed application stack, the status of each node during the deployment (e.g., the version of each software artifact to be installed on a particular node) for each configuration and the result of the deployment for each node (e.g., whether each software artifact has been properly installed on a particular node and whether a diagnostic procedure has been performed and passed) for each configuration. The certification repository 110-d may store any other information necessary for distributed application stack test certification, such as but not limited to, the certification requests from the users 106. It is understood that the data sources 110 may be maintained by the same entity that owns the cluster 104 or by a third-party, and may be implemented either on a single server having one or more databases or on multiple connected or unconnected servers.

In this exemplary system 100, the users 106, who may be network administrators, operators, developers, or customers 106-a, 106-b, . . . 106-n of the cluster 104, may send requests to the host 102 via an internal or proprietary network connection to automatically certify a configuration of the distributed application stack to be deployed on the cluster 104 based on a baseline configuration of the distributed application stack. The host 102, in response to the request, may deploy the distributed application stack on the cluster 104 based on the configuration in the request. The host 102 may receive a record from each node 104-a, 104-b, . . . 104-h, 104-i of the cluster 104 indicating a status during the deployment and/or a result after the deployment for the respective node and create a certification record for the configuration in the request based on the received records.

FIG. 1(b) presents a similarly system configuration as what is shown in FIG. 1(a) except that the host 102 is now configured as two separate machines: a certification host 102-a and a deployment host 102-b. In this exemplary system 112, only the deployment host 102-b has the super-user or administrator access privileges to all the machines of the cluster 104 for deployment. The certification host 102-a in this example may be any computing device serving as an interface for the users 106 to input the certification request.

For example, the users 106 may be developers who have their customized configurations of the distributed application stack. Through a designated certification host 102-b, the developers can certify their configurations prior to the actual deployments on the cluster 104.

FIG. 1(c) presents another similarly system configuration as what is shown in FIG. 1(b) except that the host 102-c is also one of the nodes of the cluster 104. That is, in this exemplary system 114, one machine in the cluster 104 acts as both the host and a node of the cluster 104. It is noted that different configurations as illustrated in FIGS. 1(a)-1(c) can also be mixed in any manner that is appropriate for a particular application scenario.

Figure 2A:
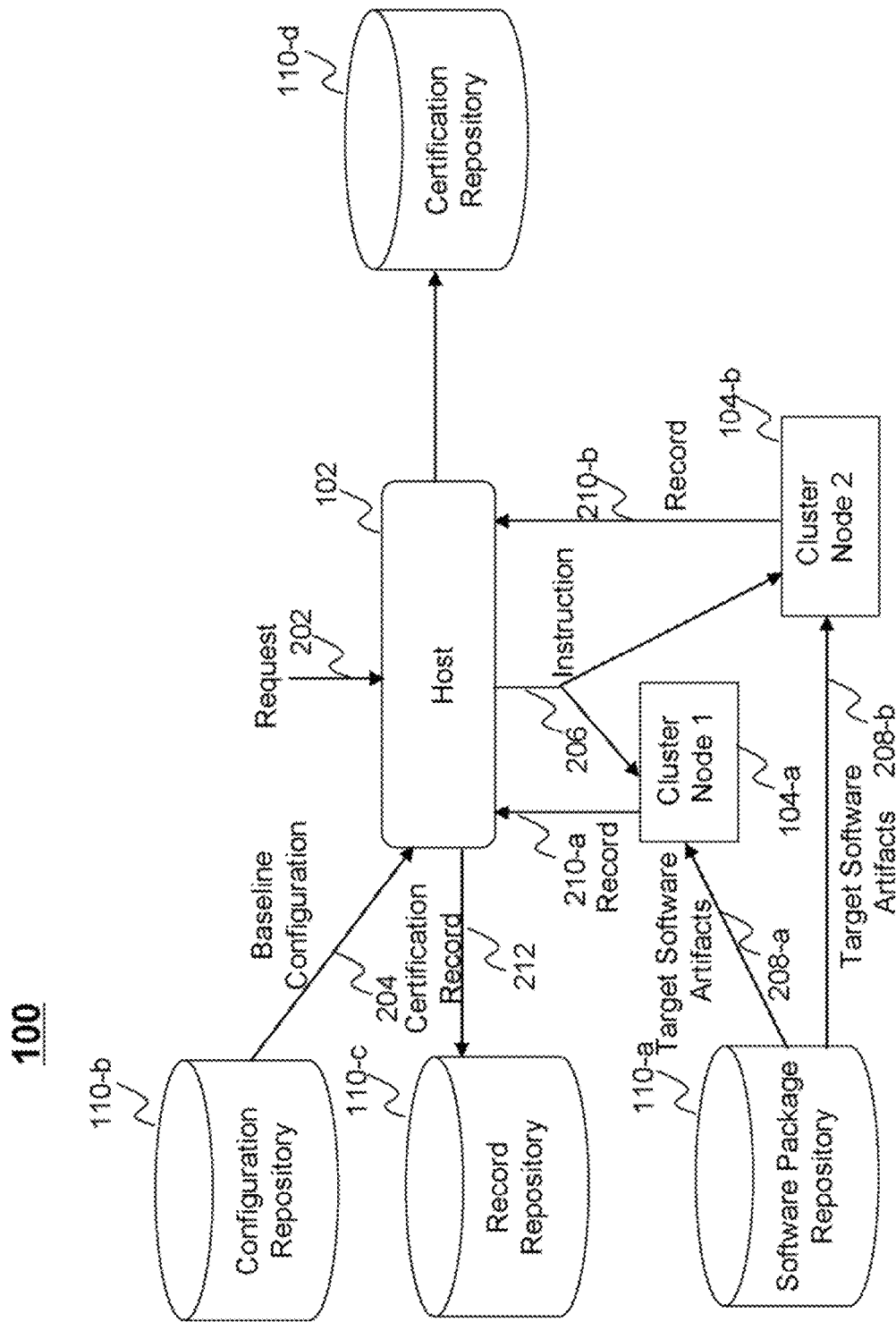
FIGS. 2(a)-2(c) are high level exemplary system diagrams of a system for automatically certifying a configuration of a distributed application stack to be deployed on a cluster, according to an embodiment of the present teaching.

FIG. 2(a) shows a more detailed high level exemplary system diagram of the system 100 shown in FIG. 1(a), according to a first application embodiment of the present teaching. In this exemplary embodiment, the system 100 includes a host 102, a plurality of cluster nodes 104-a, 104-b, a software package repository 110-a, a configuration repository 110-b, a record repository 110-c, and a certification repository 110-d. The host 102 may receive a request 202 from a user in the form of, for example, a certification form or a single-click submission. The request 202 may include a configuration of the distributed application stack to be certified based on a baseline configuration 204. Some or all of the requests 202 may be temporally or permanently stored in the certification repository 110-d.

In response to receiving the request 202, the host 102 may be responsible for retrieving the baseline configuration 204 from the configuration repository 110-b. For example, the configuration of the distributed application stack in the request 202 may include the baseline configuration 204 and deviations from the baseline configuration 204. The baseline configuration 204 may include a predetermined software configuration having the version of each software artifact of the distributed application stack and a cluster configuration having the type of each node of the cluster 104. The baseline configuration 204 may be stored and retrieved in various forms, such as but not limited to a XML file or a text file. Based on the retrieved baseline configuration 204 and the deviations from the baseline configuration 204, the host 102 may create an instruction 206 for the cluster nodes 104-a, 104-b. The instruction 206 may be used to direct each cluster node 104-a, 104-b to deploy at least one software artifact in the distributed application stack from the software package repository 110-a in each node 104-a, 104-b itself. In this example, the instruction 206 is created to work on all node types. The instruction 206 may include executable code such as a script that can be executed by the cluster nodes 104-a, 104-b and other information necessary for deployment and certification. For example, such information may include association information between one or more target software artifacts and each type of the cluster nodes 104-a, 104-b and version information of the one or more target software artifacts for each type of the cluster nodes 104-a, 104-b. The instruction 206 may also include certification information, such as testing and recording procedures to be performed in each node 104-a, 104-b during and after deployment. The instruction 206 may be transmitted to each cluster node 104-a, 104-b.

In this example, each cluster node 104-a, 104-b receives the same generic instruction 206 from the host 102. That is, it is unnecessary for the host 102 to create a customized instruction for each individual cluster node 104-a, 104-b. Based on the received instruction 206, each cluster node 104-a, 104-b may be responsible for identifying at least one target software artifacts 208-a, 208-b from all the software artifacts of the distributed application stack for the respective cluster node 104-a, 104-b. For example, for HADOOP deployment and certification, the instruction 206 may include cluster configuration indicating that the cluster node 1 104-a is a Name node in the cluster 104, association information indicating a set of target software artifacts associated with a Name node, and certification information directing the testing and recording procedures to be performed on a Name node. Accordingly, by executing the script in the instruction 206, the cluster node 1 104-a may identify its target software artifacts 208-a. Similarly, the cluster node 2 104-b may identify another set of target software artifacts 208-b, which may be different from the set of target software artifacts 208-a for the cluster node 1 104-a if the types of the two cluster nodes 104-a, 104-b are different. There may be more than one version of each target software artifact stored in the software package repository 110-a and thus, the version of each target software artifact 208-a, 208-b to be deployed may also be determined by each cluster node 104-a, 104-b based on the received instruction 206, for example, the version information as noted above. As shown in FIG. 2(a), the target software artifacts 208-a, 208-b in the determined versions may be fetched from the software package repository 110-a and installed onto each cluster node 104-a, 104-b, respectively. As noted above, in this example, all the operations on each cluster node 104-a, 104-b may be automatically performed by executing the script in the received instruction 206 with reference to the information in the instruction 206.

In this example, each cluster node 104-a, 104-b may be also responsible for performing all the testing and recording procedures for certification during and after the deployment and transmitting a record 210-a, 210-b to the host 102, which indicates the status and result of the target software artifacts fetching, installation, and verification. The host 102 then may collect the records 210-a, 210-b from all the nodes of the cluster 104 and create a certification record 212 for the configuration to be certified in the request 202 based on the received records 210-a, 210-b. The certification record 212 may be published and stored in the record repository 110-c in the form of, for example, a log file, a TWiki page, or any other suitable form.

Figure 2B:
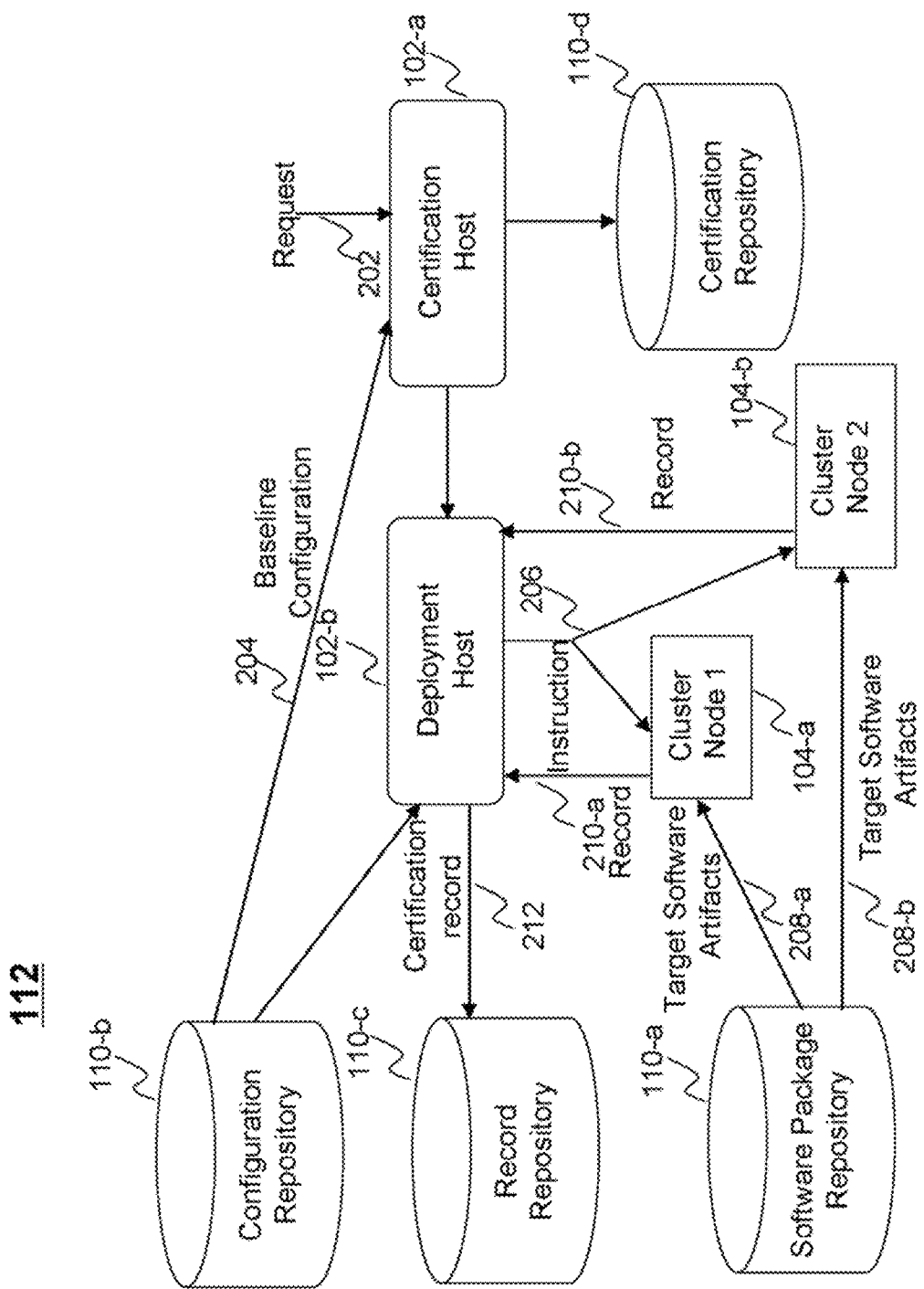

FIG. 2(b) shows a more detailed high level exemplary system diagram of the system 112 shown in FIG. 1(b), according to a second application embodiment of the present teaching. FIG. 2(b) presents a similar system configuration as what is shown in FIG. 2(a) except that the host 102 is now configured as two separate machines: a certification host 102-a and a deployment host 102-b. In this example, the certification host 102-a may be responsible for receiving the certification requests 202 from the users and storing the requests 202 in the certification repository 110-d. Since the certification host 102-a may not have the access privilege to the cluster 104 and/or some of the data sources 110, in this example, the certification host 102-a may generate an instruction, including executable code such as one or more scripts and information of the received request 202. The first script may log into the deployment host 102-b and cause the deployment host 102-b to execute the second script with reference to the information of the received request 202. The deployment host 102-b then may perform all other functions of the host 102, as described in FIG. 2(a).

Figure 2C:
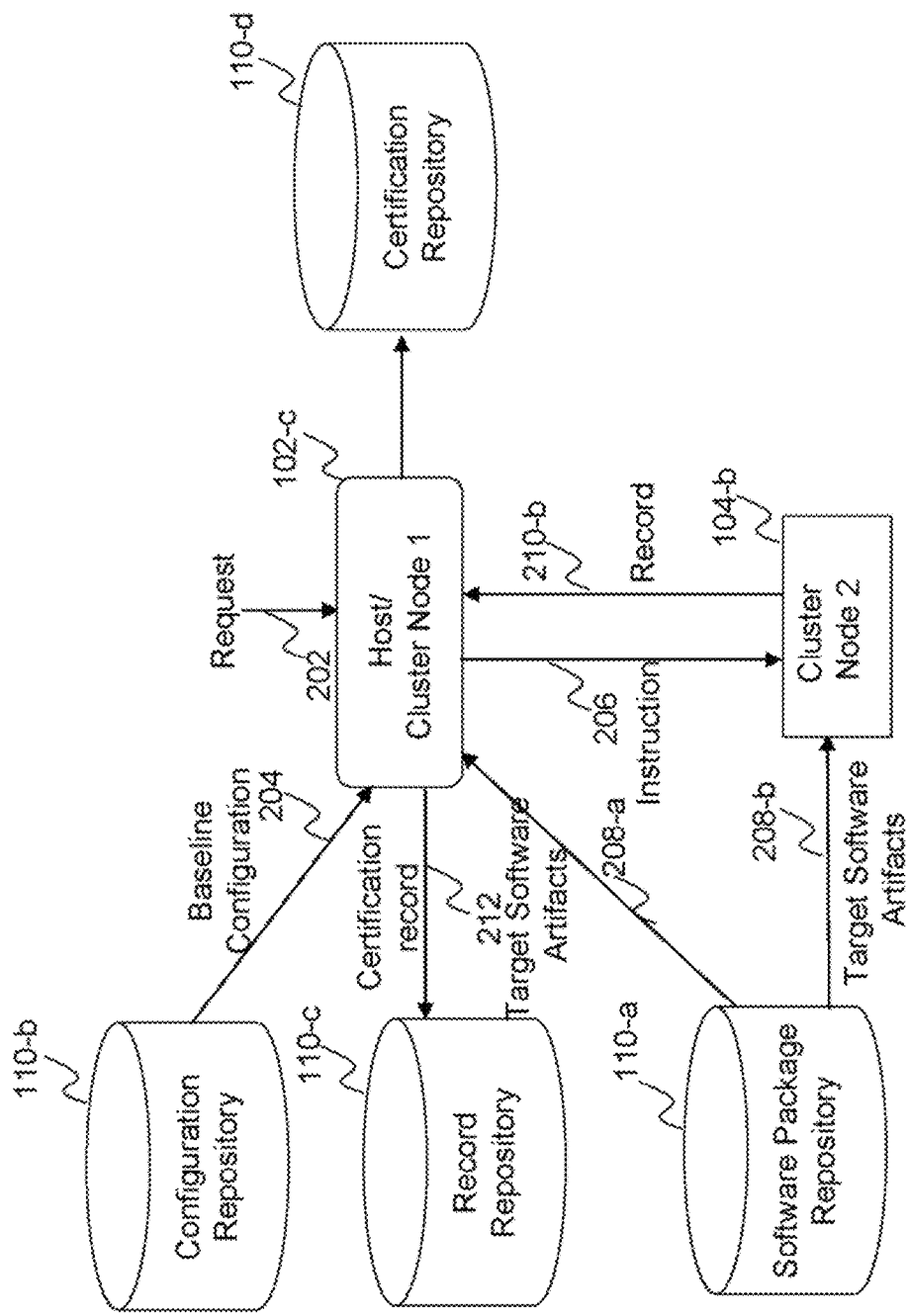

FIG. 2(c) shows a more detailed high level exemplary system diagram of the system 114 shown in FIG. 1(c), according to a third application embodiment of the present teaching. FIG. 2(c) presents a similar system configuration as what is shown in FIG. 2(a) except that the host 102-c is also one of the nodes of the cluster 104. In this example, since the host 102-c is also a cluster node, a set of target software artifacts 208-a may also need to be deployed on the host 102-c based on its type in the cluster 104. Different from the cluster node 2 104-b, the instruction 206 and the record 210-a of the cluster node 1 (i.e., the host 102-c in this example) do not need to be transmitted through the network connecting the cluster nodes. Other than that, the host 102-c may perform all the functions of the cluster node 1 104-a, as described in FIGS. 2(a) and 2(b).

Figure 3:
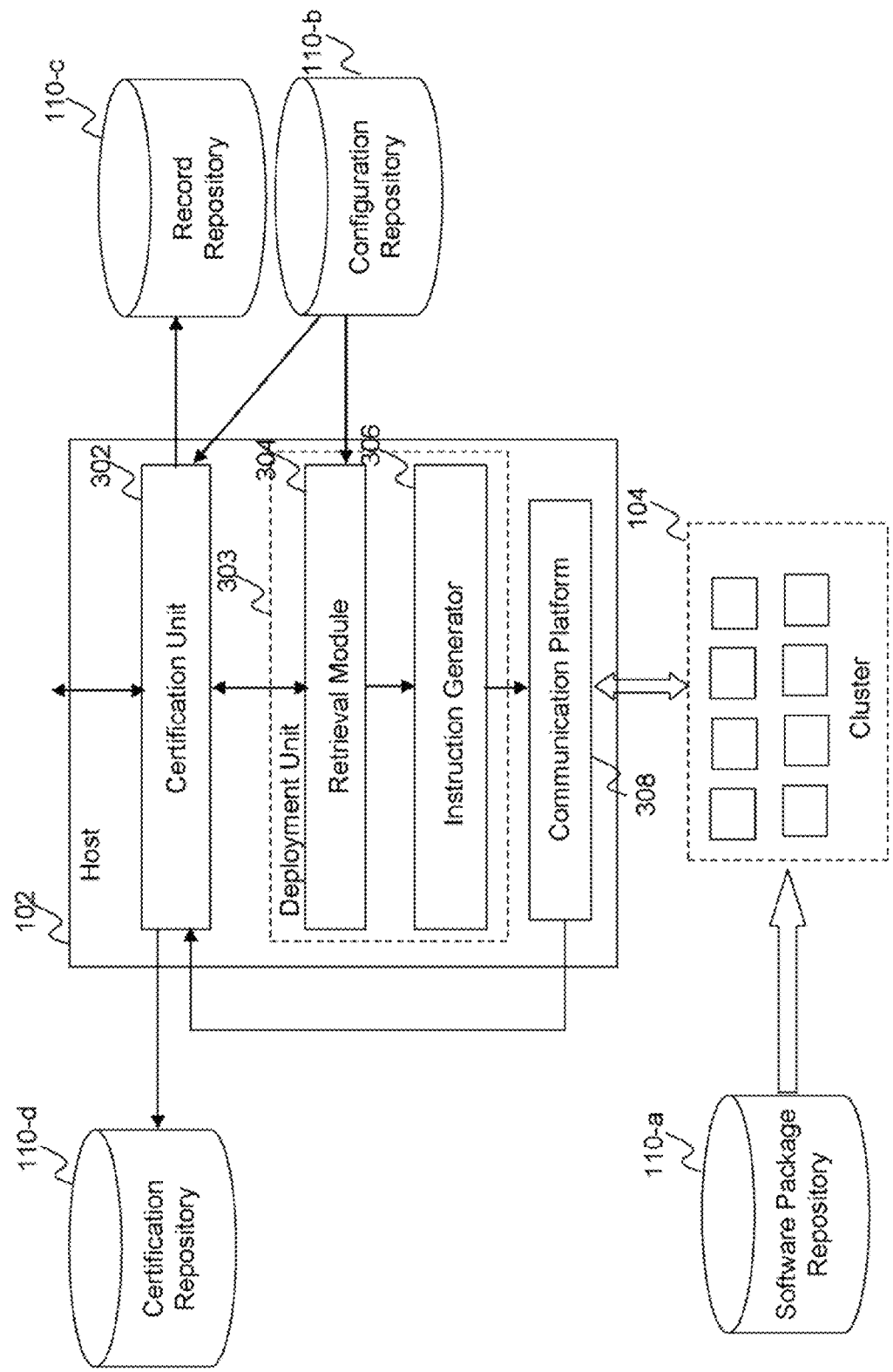
FIG. 3 is a depiction of an exemplary host of the system for automatically certifying a configuration of a distributed application stack to be deployed on a cluster shown in FIGS. 2(a)-2(c), according to an embodiment of the present teaching.

FIG. 3 depicts an exemplary system diagram of the host 102, according to an embodiment of the present teaching. In this exemplary embodiment, the host 102 acts as both a certification host 102-a and a deployment host 102-b. In this example, the host 102 includes a certification unit 302, a deployment unit 303 having a retrieval module 304 and an instruction generator 306, and a communication platform 308. In another exemplary embodiment, the certification host 102-a and the deployment host 102-b are two separate machines as shown in FIGS. 1(b) and 2(b), where the certification unit 302 resides on the certification host 102-a while the deployment unit 303 resides on the deployment host 102-b.

Figure 6:
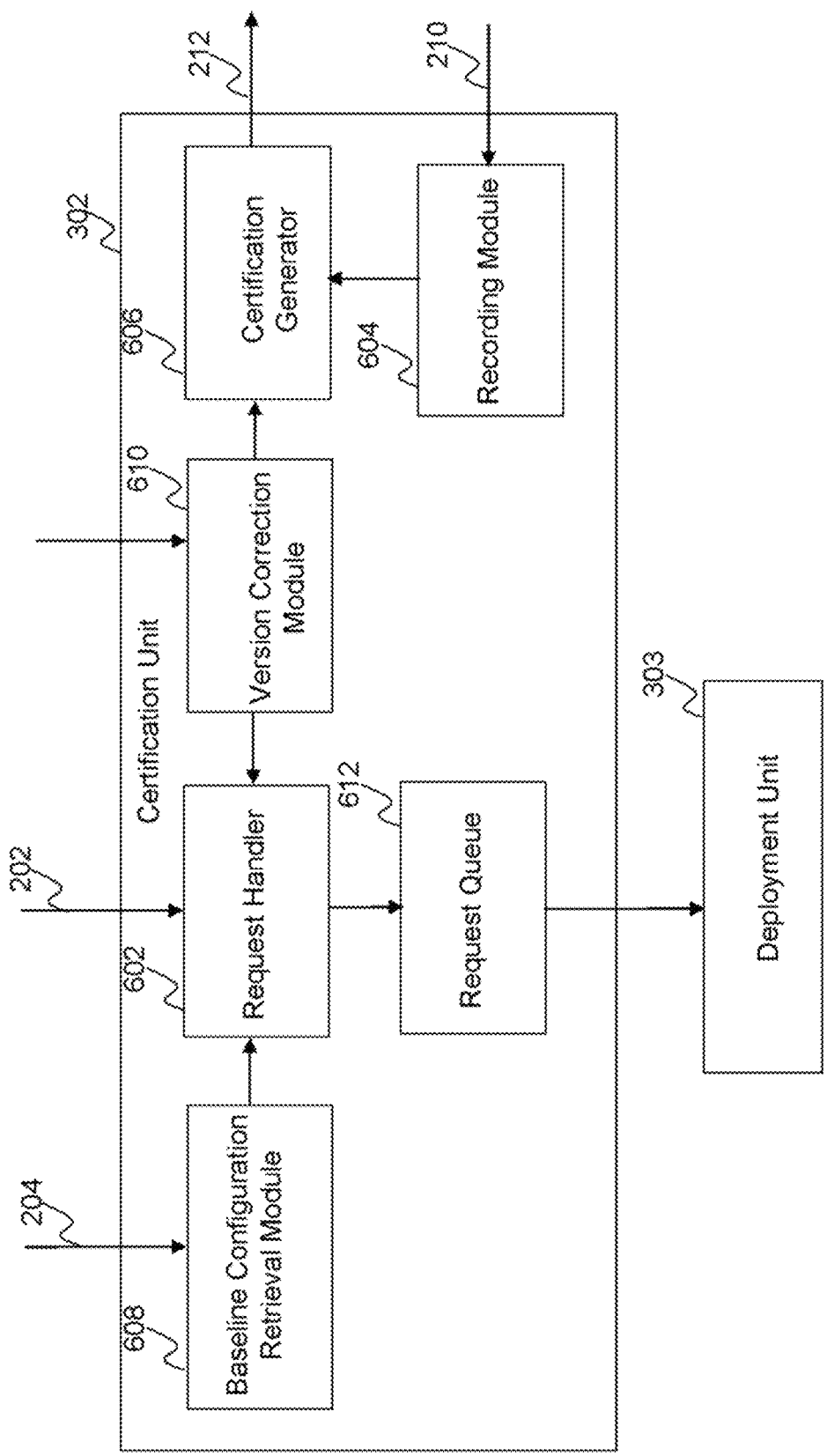
FIG. 6 is a depiction of an exemplary certification unit of the system for automatically certifying a configuration of a distributed application stack to be deployed on a cluster shown in FIGS. 3 and 5, according to an embodiment of the present teaching.

The certification unit 302 is operatively coupled to the configuration repository 110-b, the record repository 110-c, and the certification repository 110-d. Referring now to FIG. 6, an exemplary certification unit 302 includes a request handler 602, a recording module 604, a certification generator 606, a baseline configuration retrieval module 608, a version correction module 610, and a request queue 612. In this example, the request handler 602 is configured to receive one or more requests 202 to certify one or more configurations of the distributed application stack to be deployed on the cluster 104 based on a baseline configuration 204 of the distributed application stack. For example, the configuration of the distributed application stack includes versions of at least some software artifacts to be deployed on the cluster 104 (software configuration). Referring now to FIG. 9(a), each request 202 may include an ID, a date of request, a baseline version (e.g., a name in this example), and deviations from the baseline configuration. In order to provide the baseline configuration 204, the baseline configuration retrieval module 608 is operatively coupled to the request handler 602 and is configured to, by executing executable code such as a script, retrieve the baseline configuration information 204 of the distributed application stack from, for example, the configuration repository 110-d. The baseline configuration is a "special" configuration that is published or dispatched to the users periodically or from time to time. The users then may sign-off the baseline configuration and create their own configurations based on the baseline configuration, but have no control over the creation and modification of the baseline configuration. The signed-off baseline configurations 204 may be temporally or permanently stored in the configuration repository 110-b and retrieved by the baseline configuration retrieval module 608. Each baseline configuration 204 may be identified by a version, such as a formal name, an alias, or a number.

For example, as shown in FIG. 9(a), the version of a baseline configuration 204 of a HADOOP stack is identified as "Fred." The baseline configuration 204 may include the software artifacts and their corresponding versions. FIG. 9(b) shows one example of the configuration information of "Fred." For example, "Fred" includes 15 software artifacts. The version of HDFS Proxy component in "Fred" is 3.0.0.0.1104072227, and the version of DAQ component is 0.1.1104262128. Since some components of a HADOOP stack may include more than one software artifact, the version of each software artifact in those components may be separately defined in the baseline configuration 204. For example, Hive component may include a client artifact and a server artifact having the same version of 0.0.7_6. In this example, all the software artifacts are in the version-controlled package formats, such as but not limited to TAR, GZ, CAB, ZIP, RAR, etc. As noted above, the baseline configuration information 204 may be temporally or permanently stored in the configuration repository 110-b, and the user may only need to provide the version of the baseline configuration 204 (e.g., "Fred" in the example mentioned above) in order for the baseline configuration retrieval module 608 to retrieve the correct configuration information 204 from the configuration repository 110-b. It is understood that, in another example, the user may provide the baseline configuration information 204 (e.g., software artifacts and their corresponding versions) directly in the request, instead of just the version. In that example, the baseline configuration retrieval module 608 may no longer need to retrieve the baseline configuration 20 from the configuration repository 110-b.

In FIG. 6, more than one request may be received from the same or different users to certify various configurations of the distributed application stack. Thus, the request handler 602 is further configured to receive a plurality of requests 202 to certify a plurality of configurations of the distributed application stack based on one or more baseline configurations 204. The certification unit 302 may include the request queue 612 operatively coupled to the request handler 602 to temporally store the requests 202. In one example as shown in FIG. 9(a), the request queue 612 may include both a baseline configuration and other configurations derived from the baseline configuration. In one example, a request to certify a baseline configuration is kept on top of the queue while other requests are sorted by request time/date. Optionally, some or all of the requests 202 in the request queue 612 may be further stored in the certification repository 110-d for future access if necessary. Although there is only one request queue 612 is shown in FIG. 6, it is understood that multiple request queues may be applied in another example. Each request queue may include one baseline configuration such that each incoming configuration to be certified is allocated to a corresponding request queue based on which base line configuration the incoming configuration is derived from.

In FIG. 6, the request handler 602 is further configured to generate an instruction for deploying the distributed application stack on the cluster based on a request on top of the request queue 612. For deploying the distributed application stack based on a baseline configuration, the instruction may include the configuration information retrieved by the baseline configuration retrieval module 608 or received in the request. For deploying the distributed application stack based on configurations derived from the baseline configuration, the request handler 602 may first obtain the baseline configuration information 204 and the deviations from the baseline configuration. The request handler 602 then may determine the actual configuration information to be certified based on the baseline configuration and deviations and include the actual configuration information in the instruction Referring now to FIG. 9(a), in this example, request #2 includes a baseline configuration "Fred" and a deviation thereof. Since the configuration information of "Fred" may be obtained by the request handler 602, for example, as shown in FIG. 9(b), the request handler 602 in this example may further determine that the software configuration to be certified in request #2 is the same as the baseline configuration "Fred" expect that it has an additional Pig component with a version of 0.9. The instruction may be sent to the deployment unit 303 for directing the deployment of the distribute application stack based on the software configuration in the request. The deployment will be described in detail later.

Referring back to FIG. 6, the recording module 604 in this example is configured to receive a record 210 from each node of the cluster 104 indicating a status during the deployment and/or a result after the deployment for the respective node. The certification unit 302 may also include the certification generator 606 operatively coupled to the recording module 604. The certification generator 606 is configured to create a certification record 212 for the configuration in the request based on the received records 210. The certification record 212 includes, for example, the software configuration in the request, the baseline configuration, a description of the cluster, a status for each software artifact during the deployment, a result for each software artifact after the deployment, or any other suitable information for certification. The created certification record 212 may be stored in the record repository 110-c and/or published as a proof of the distributed application stack test based on a certain software configuration. It is understood that although the record repository 110-c in FIG. 3 is remote from the host 102, in other examples, the record repository 110-c may be part of the host 102. FIG. 9(c) illustrates one example of the certification record 212. The certification records 212 may be associated with the corresponding requests in the request queue 612 as shown in FIG. 9(a). For example, the baseline configuration "Fred" in request #1 fails in some testing procedures and thus, may not be certified; an updated baseline configuration "Fred" in request #3 passes all or most of the testing procedures and thus, is associated with a certification record 0001. It is understood that the certification unit 302 may continue to certify the next request on top of the request queue 612 in sequence.

In this example, the certification unit 302 further includes the version correction module 610 operatively coupled to the request handler 602. The version correction module 610 configured to, in response to a change of the version of at least one software artifact in the distributed application stack, identify a certified configuration that includes the at least one software artifact with the changed version. The version of one or more software artifacts in the distributed application stack may be updated periodically or from time to time. Accordingly, all configurations that involve the updated software artifacts may need to be tested again for "re-certification." The version correction module 610 may either automatically check the software repository 110-a for any version change of the stored software artifacts or may directly receive a notice about a version change. FIG. 9(d) illustrates a software artifact version change table as one example of the notice. The table may include, for example, the version change request date, the name of the affected software artifact, the old and new version, and the party sent out the notice. The version correction module 610 then may check the record repository 110-c to identify all previously certified configurations that are affected by the version change and forward information regarding the identified configurations to the request handler 602 as a new certification request. The request handler 602 then may either automatically, or upon manual approval, cause the deployment unit 303 to re-deploy the identified configurations with the updated version of software artifacts and cause the certification generator 606 to create updated certification records for all the configurations affected by the version change.

Referring back to FIG. 3, in this example, the retrieval module 304 of the deployment unit 303 is operatively coupled to the certification unit 302 and the configuration repository 110-*b*. The retrieval module 304 is configured to, based on the instruction received from the certification unit 302, retrieve additional deployment information from the configuration repository 110-*b*. The instruction from the certification unit 302 may include the version of each software artifact of the distributed application stack to be deployed on the cluster 104 (software configuration to be certified), and thus, the retrieval module 304 may only need to retrieve the description of the cluster 104 that specifying the type of each node of the cluster 104.

In this example, the type of each node may be obtained based on a description of the cluster 104 to be deployed. Referring now to FIG. 9(*c*) in which an exemplary cluster configuration having the type of each node in a HADOOP cluster is illustrated, the cluster configuration may contain a list of 20 nodes participating in a cluster "Hit2," including regular working nodes (data nodes) and "special" nodes (the ones other than regular working nodes: e.g., Oozie node, Gateway node, etc.). For example, the node "gsb190949 blue.ygrid.yahoo.com" is defined as the Name node, and the node "gsb190947.blue.ygrid.yahoo.com" is defined as the Secondary node. It is understood that although each node in FIG. 9(*c*) is identified in the form of a domain name, any other suitable form, for example IP address and alias, may be applied in other examples. All the cluster configurations may have already been predefined by a user or a third-party in advance to the deployment and stored in the configuration repository 110-*b*. Depending on the specific descriptions of clusters, various cluster configurations may be retrieved by the retrieval module 304.

The configuration of the distributed application stack is orthogonal to the description of the cluster 104. That is, the description of the cluster 104 determines which conceptual role (type) each node plays (e.g. regular working node, Name node server, gateway, etc.), and the configuration of the distributed application stack (i.e. a set of software artifacts versions) specifies which software artifacts and the versions thereof will be deployed on each particular node, so that the node can carry out its role.

Referring back to FIG. 3, in this example, the instruction generator 306 of the deployment unit 303 is operatively coupled to the retrieval module 304 and is configured to create a deployment instruction for the nodes of the cluster 104 based on the configuration of the distributed application stack and the description of the cluster 104. For example, the instruction generator 306, by executing executable code such as a script, may read the cluster configuration and the software configuration to be certified to generate association information between at least one target software artifact and each type of the nodes. That is, each type of cluster node is mapped to a set of target software artifacts that are necessary for the particular type of cluster node to act properly. For example, as noted above in FIG. 2(*a*), a set of target software artifacts 208-*a* may be associated with a Name node, while another set of target software artifacts 208-*b* may be associated with a Secondary node. Although it is usually not necessary to further map each individual cluster node to a set of target software artifacts at the host side, in some examples, such mapping may be performed by the instruction generator 306 of the host 102.

The instruction generator 306 may also generate version information of the at least one target software artifact for each type of node. That is, the version of each target software artifact for each type of node may be identified based on the software configuration in the certification request. The instruction generator 306 is further configured to provide the instruction by including the association information and the version information into the instruction. The cluster configuration retrieved by the retrieval module 304 may be incorporated into the association information or separately included into the instruction by the instruction generator 306.

The instruction generator 306 may further generate testing information for each type of node and or each type of software artifact in order to certify the request configuration. For example, a particular set of testing and recording procedures may be predefined for a particular type of node or software artifact. The testing and recording procedures may be executable code, such as scripts, that can be automatically triggered and executed during or after the deployment on each node. The instruction may be created by the instruction generator 306 in the form of a compressed or non-compressed software package. In this example, the instruction generator 306 is also configured to cause the communication platform 308 to transmit the instruction to each node of the cluster 104.

Figure 4:
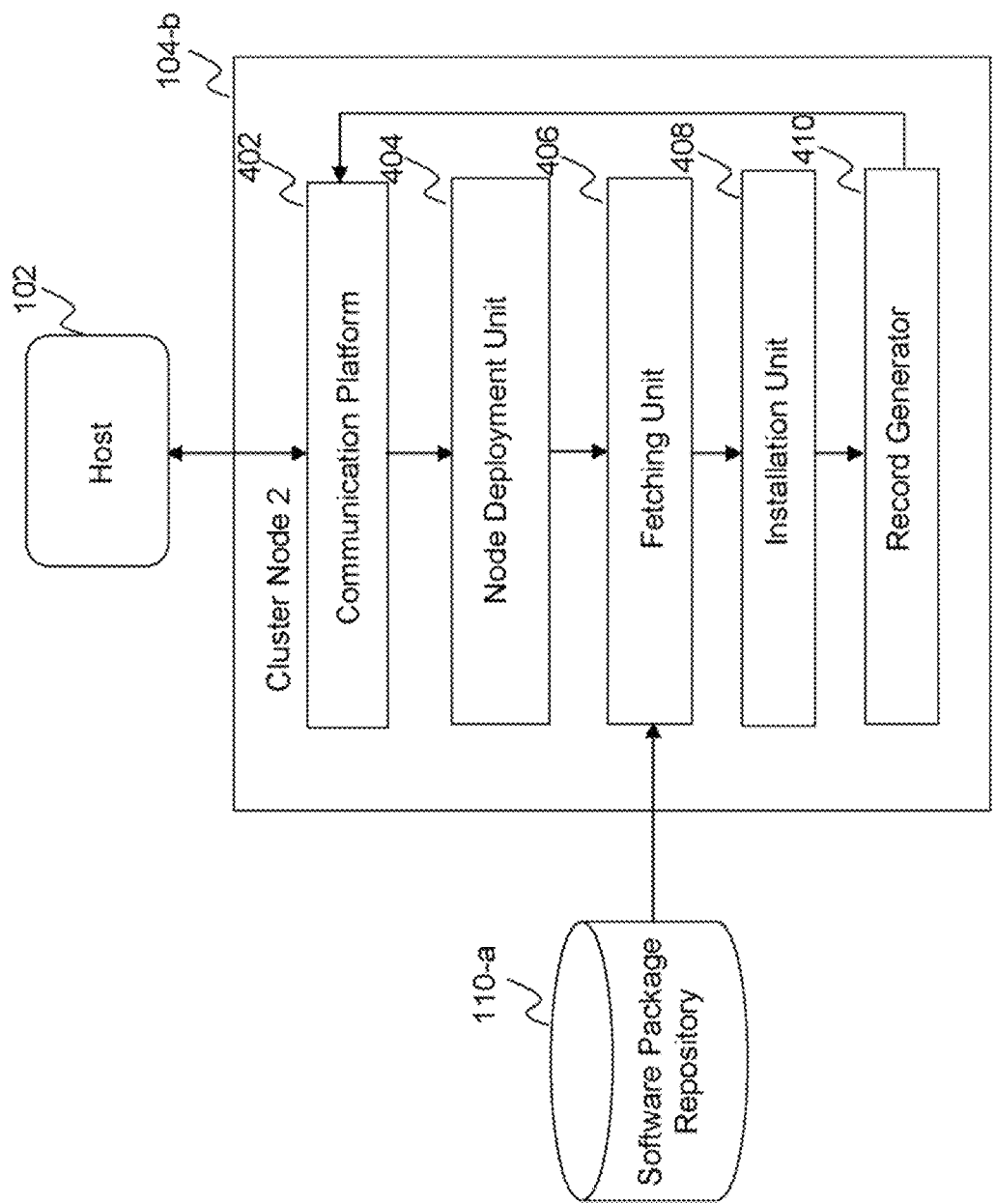
FIG. 4 is a depiction of an exemplary cluster node of the system for automatically certifying a configuration of a distributed application stack to be deployed on a cluster shown in FIGS. 2(a)-2(c), according to an embodiment of the present teaching.

FIG. 4 depicts an exemplary system diagram of the cluster node 104-*b*, according to an embodiment of the present teaching. In this exemplary embodiment, the cluster node 104-*b* includes a communication platform 402, a node deployment unit 404, a fetching unit 406, an installation unit 408, and a record generator 410. The communication platform 402 receives the instruction from the host 102 and forwards the instruction to the node deployment unit 404. If the instruction is received in the form of a software package, the instruction may be first unpackaged into the local file system of the cluster node 104-*b*. In this example, the node deployment unit 404 is configured to identify at least one target software artifact from the plurality of software artifacts for the specific cluster node 104-*b* based on the instruction, for example, the association information as noted above. For example, the association information in the instruction may associate the Secondary node type of cluster nodes to a particular set of software artifacts in the distributed application stack. The script in the instruction may be executed by the node deployment unit 404 to identify that the cluster node 104-*b* is a Secondary type cluster node according to the cluster configuration, which may be part of the association information. The node deployment unit 404 may further identify the set of target software artifacts to be installed on the cluster node 104-*b* according to the mapping in the association information. In this example, the node deployment unit 404 is also configured to determine the version of each identified target software artifact based on the instruction, for example, the version information.

In this example, the fetching unit 406 is operatively coupled to the software package repository 110-*a* and the node deployment unit 404. The fetching unit 406 is configured to fetch the identified at least one target software artifact in the determined version from the software package repository 110-*a*. The fetching may be performed by the fetching unit 406 under any suitable protocols known in the art, such as but not limited to FTP, SCP, SSH, P2P, etc. In this example, each software artifact is stored in a version-controlled package format in the software package repository 110-*a*. A version-controlled package format may be, for example, a compressed TAR file or any other suitable file containing all files for a given software artifact. The package may also contain several manifest files describing component versions and other component-related information. An integral feature of this package system is a server-based repository of all the packages. Once a package is created, it is uploaded to the software package repository 110-*a*. From this point on, the package may be permanently kept in the software package repository 110-*a* and associated with a version that was given to it at its creation time. This guarantees that the association between the software package and the version is permanent and immutable. Accordingly, each software artifact may be stored in the software package repository 110-*a* under various versions, and the fetching unit 406 may fetch the version that is determined by the node deployment unit 404 based on the instruction from the host 102.

In this example, the installation unit 408 is operatively coupled to the fetching unit 406 and configured to install the fetched target software artifacts onto the machine. If the target software artifacts are in the version-controlled package format, the installation unit 408 may unpack all the files into the local file system of the cluster node 104-*b* before installation. The installation unit 408 may further perform any suitable operation specific to the particular type of node to complete the installation.

The record generator 410 is configured to run the testing and recording procedures in the instruction to verify whether the installation has been successful and record the test results. The record generator 410 is operatively coupled to the installation unit 408 and is configured to cause the communication platform 402 to transmit the record to the host 102. For example, the record generator 410 may record all the information related to the deployment and certification, such as the name, version, installation time, and size of each software artifact installed on the machine, whether the installation of each software artifact is successful, and whether each testing procedure is passed or not. The record may be generated in the form of, for example, a log file or a TWiki page.

Figure 5:
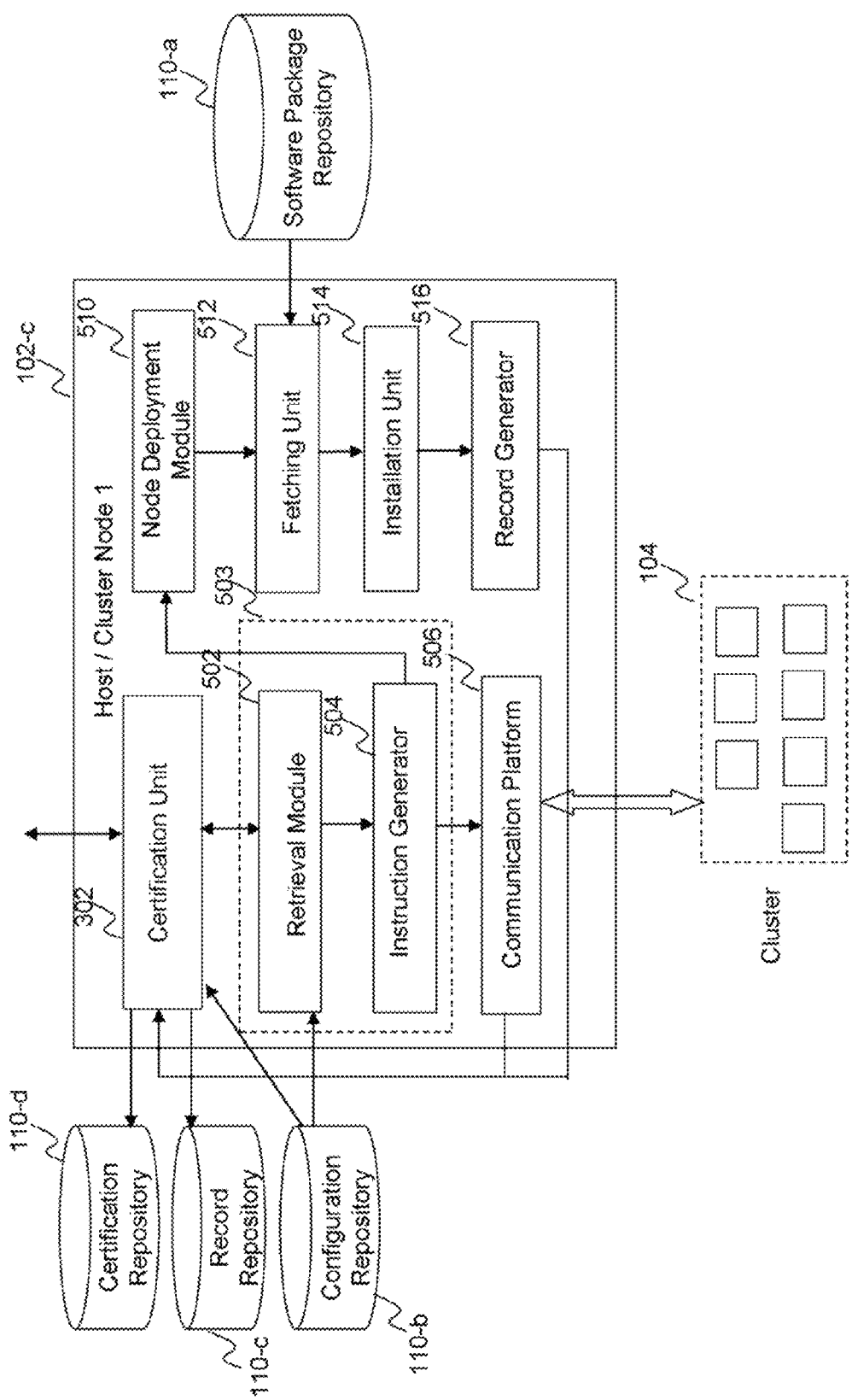
FIG. 5 is a depiction of an exemplary host/cluster node of the system for automatically certifying a configuration of a distributed application stack to be deployed on a cluster shown in FIGS. 2(a)-2(c), according to an embodiment of the present teaching.

FIG. 5 depicts an exemplary system diagram of the host/cluster node 102-*c*, according to an embodiment of the present teaching. In this exemplary embodiment, the host/cluster node 102-*c* includes the certification unit 302, a deployment unit 503 having a retrieval module 502 and an instruction generator 504, a communication platform 506, a node deployment unit 510, a fetching unit 512, an installation unit 514, and a record generator 516. Most of the units in this example perform the similar functions of their counterparts in FIGS. 3 and 4. The instruction generator 504 in this example, in addition to causing the communication platform 506 to transmit the instruction to the rest of the cluster 104, may directly forward the instruction to the node deployment unit 510 in the same machine. The record generator 516 in this example may not cause the communication platform 506 to transmit the record, but instead, may directly forward the record to the certification unit 302.

Figure 7:
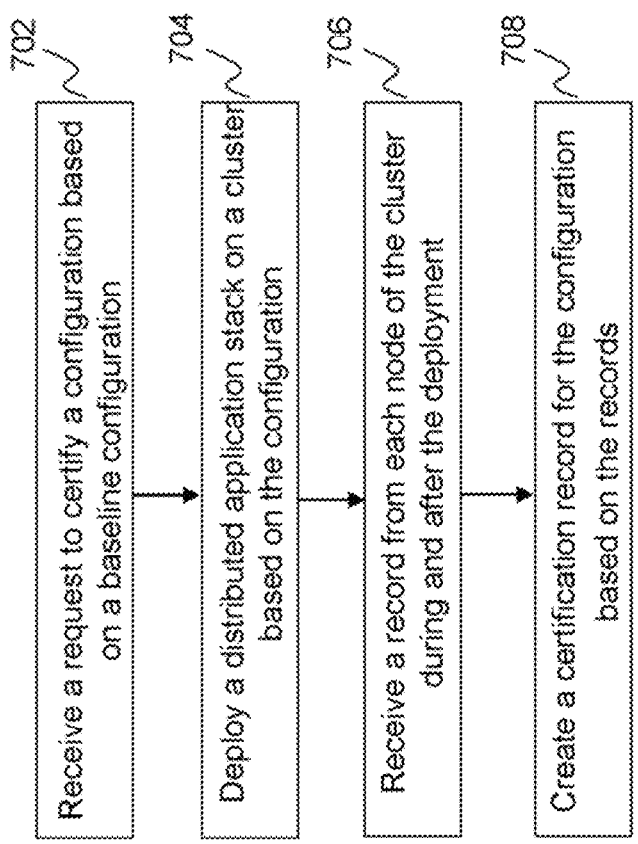
FIG. 7 is a flowchart of an exemplary process for automatically certifying a configuration of a distributed application stack to be deployed on a cluster, according to an embodiment of the present teaching.

FIG. 7 is a flowchart of an exemplary process in which a configuration of a distributed application stack is automatically certified, according to an embodiment of the present teaching. Beginning at block 702, a request to certify a configuration of a distributed application stack to be deployed on a cluster based on a baseline configuration of the distributed application stack is received. The configuration of the distributed application stack includes a version of each of the plurality of software artifacts. As described above, this may be performed by the request handler 602 of the certification unit 302. At block 704, processing may continue where the distributed application stack is deployed on the cluster based on the configuration in the request. As described above, this may be performed by the deployment unit 303, 503. At block 706, a record from each node of the cluster indicating a status during the deployment and/or a result after the deployment for the respective node is received. As described above, this may be performed by the recording module 604 of the certification unit 302. Proceeding to block 708, a certification record is created for the configuration in the request based on the received records. As described above, this may be performed by the certification generator 606 of the certification unit 302.

Figure 8:
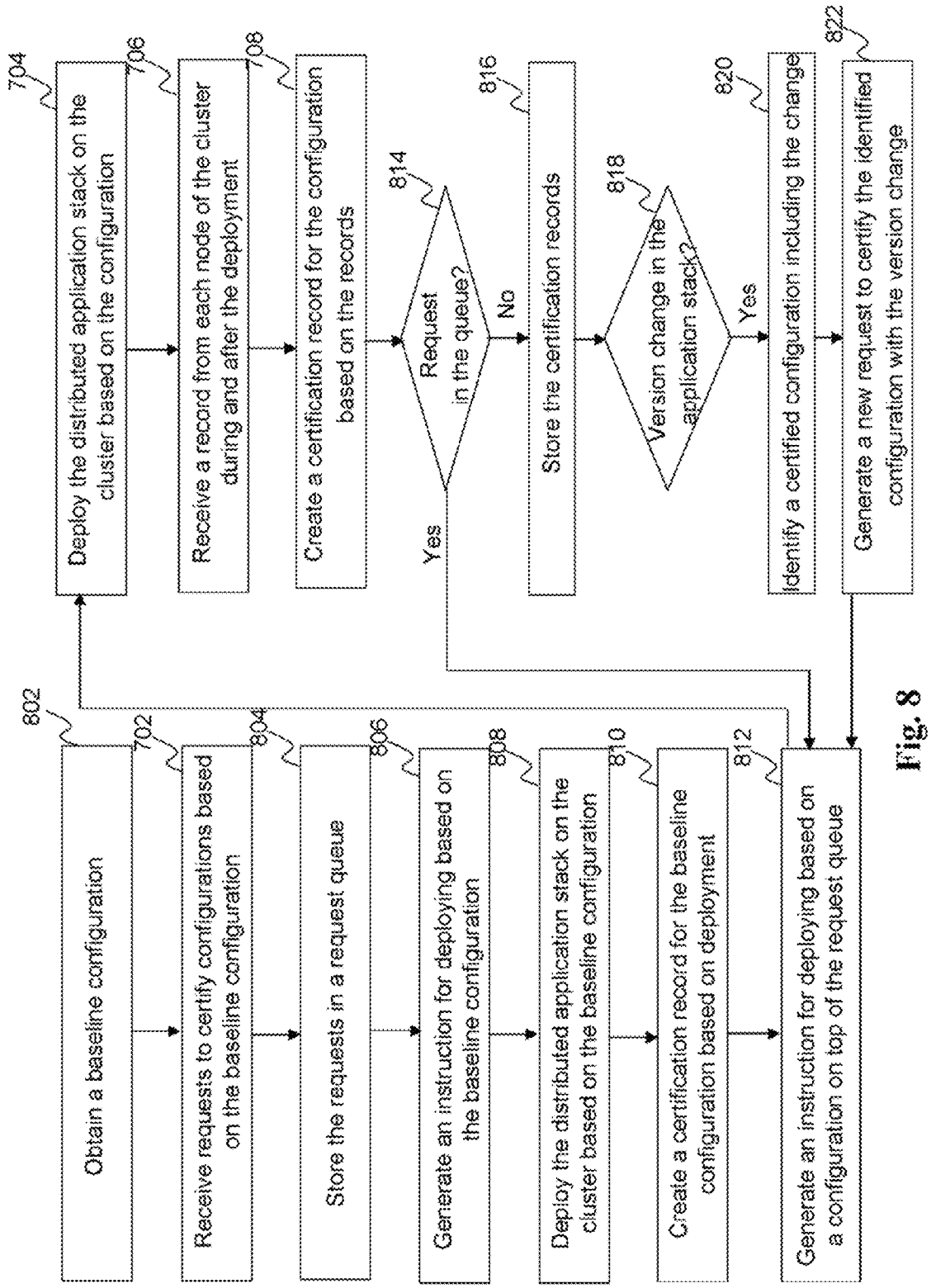
FIG. 8 is a more detailed flowchart of the exemplary process for automatically certifying a configuration of a distributed application stack to be deployed on a cluster shown in FIG. 7, according to an embodiment of the present teaching.

FIG. 8 is a more detailed flowchart of an exemplary process in which a configuration of the distributed application stack is automatically certified, according to an embodiment of the present teaching. Beginning at block 802, a baseline configuration of the distributed application stack is obtained. As described above, this may be performed by the baseline configuration retrieval module 608 or the request handler 602 of the certification unit 302. At block 702, processing may continue where one or more requests to certify one or more configurations of the distributed application stack to be deployed on the cluster based on a baseline configuration is received. At block 804, the requests to certify the configurations and a request to certify the baseline configuration are stored in a request queue. Proceeding to block 806, an instruction for deploying the distributed application stack on the cluster based on the baseline configuration is generated. As described above, blocks 702, 804, 806 may be performed by the request handler 602 of the certification unit 302. At block 808, the distributed application stack is deployed on the cluster based on the baseline configuration. As described above, this may be performed by the deployment unit 303, 503. At block 810, a certification record is created for the baseline configuration based on a status during the deployment and/or a result after the deployment for each node. As described above, this may be performed by the certification generator 606 in conjunction with the recording module 604 of the certification unit 302. At block 812, an instruction for deploying the distributed application stack on the cluster based on a request on top of the request queue is generated. The request includes the next configuration to be certified in the queue. As described above, this may be performed by the request handler 602 of the certification unit 302. At block 704, processing may continue where the distributed application stack is deployed on the cluster based on the configuration in the next request. As described above, this may be performed by the deployment unit 303, 503. At block 706, a record from each node of the cluster indicating a status during the deployment and/or a result after the deployment for the respective node is received. As described above, this may be performed by the recording module 604 of the certification unit 302. Proceeding to block 708, a certification record is created for the configuration in the next request based on the received records. As described above, this may be performed by the certification generator 606 of the certification unit 302.

At block 814, whether there is another request in the request queue is checked. If there are more requests in the request queue, processing may continue to block 812 to certify the configuration in the next request. If there is no more request in the request queue, processing may continue at block 816 where the created certification records are stored in a record repository. As described above, this may be performed by the certification generator 606 of the certification unit 302. At block 818, whether a change of the version of at least one software artifact in the distributed application stack is determined. In response to the change, at block 820, one or more certified configurations that include the at least one software artifact with the changed version are identified. At block 822, a new request to certify the identified configurations with the version change is generated, and the processing may continue to block 812 to re-certify the identified configurations. As described above, blocks 818, 820, 822 may be performed by the version correction module 610 of the certification unit 302.

Although the processing illustrated in FIG. 8 is illustrated in a particular order, those having ordinary skill in the art will appreciate that the processing can be performed in different orders. For example, block 802 can be performed after block 702 or performed essentially simultaneously.

To implement the present teaching, computer hardware platforms may be used as the hardware platform(s) for one or more of the elements described herein. The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

FIG. 10 depicts a general computer architecture on which the present teaching can be implemented and has a functional block diagram illustration of a computer hardware platform that includes user interface elements. The computer may be a general-purpose computer or a special purpose computer. This computer 1000 can be used to implement any components of the distributed application stack certification architecture as described herein. Different components of the system 100, 112, 114, e.g., as depicted in FIGS. 1(*a*), 1(*b*), 1(*c*), 2(*a*), 2(*b*), and 2(*c*), can all be implemented on one or more computers such as computer 1000, via its hardware, software program, firmware, or a combination thereof. Although only one such computer is shown, for convenience, the computer functions relating to dynamic relation and event detection may be implemented in a distributed fashion on a number of similar platforms, to distribute the processing load.

The computer 1000, for example, includes COM ports 1002 connected to and from a network connected thereto to facilitate data communications. The computer 1000 also includes a central processing unit (CPU) 1004, in the form of one or more processors, for executing program instructions. The exemplary computer platform includes an internal communication bus 1006, program storage and data storage of different forms, e.g., disk 1008, read only memory (ROM) 1010, or random access memory (RAM) 1012, for various data files to be processed and/or communicated by the computer, as well as possibly program instructions to be executed by the CPU. The computer 1000 also includes an I/O component 1014, supporting input/output flows between the computer and other components therein such as user interface elements 1016. The computer 1000 may also receive programming and data via network communications.

Hence, aspects of the method of automatically certifying a configuration of a distributed application stack on a cluster, as outlined above, may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links or the like, also may be considered as media beating the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the units of the host and the client nodes as disclosed herein can be implemented as a firmware, firmware/software combination, firmware/hardware combination, or a hardware/firmware/software combination.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method, implemented on at least one machine each of which has at least one processor, storage, and a communication platform connected to a network for automatically certifying a configuration of a distributed application stack, the method comprising the steps of:
  receiving a request to certify a configuration of a distributed application stack to be deployed on a cluster including a plurality of nodes based on a baseline configuration of the distributed application stack, wherein the configuration of the distributed application stack includes a version of each of a plurality of software artifacts, and wherein the baseline configuration has been provided previously, which can be used to create the configuration specified in the request;
  generating an instruction based on the configuration specified in the request for deploying the distributed application stack on the cluster, wherein the instruction associates each-of the plurality of software artifacts with a type of the plurality of nodes on which the respective software artifact is to be deployed;
  deploying the distributed application stack on the cluster in accordance with the instruction;
  receiving a record from each node of the cluster indicating one or more of the plurality of software artifacts with a respective status of the deployment and a result after the deployment of each of the one or more of the plurality of software artifacts with respect to the respective node in the cluster; and
  creating a certification record for the configuration specified in the request based on the received records from the plurality of nodes in the cluster, wherein the certification record includes a description of the configuration of the distributed application stack deployed on the nodes of the cluster and a result for each software artifact after the deployment.

2. The method of claim 1, further comprising:
  in response to a change of the version of at least one software artifact in the distributed application stack, identifying a certified configuration that includes the at least one software artifact with the changed version;
  deploying the distributed application stack on the cluster based on the identified configuration that includes the at least one software artifact with the changed version; and
  creating an updated certification record for the identified configuration.

3. The method of claim 1, further comprising:
  obtaining the baseline configuration of the distributed application stack;
  deploying the distributed application stack on the cluster based on the baseline configuration;
  creating a certification record for the baseline configuration based on a status of the deployment and/or a result after the deployment for each node; and
  storing, in a record repository, the certification record for the configuration in the request and the certification record for the baseline configuration.

4. The method of claim 1, wherein the step of receiving a request comprising:
  receiving a plurality of requests to certify a plurality of configurations of the distributed application stack based on the baseline configuration of the distributed application stack;
  storing the plurality of requests to certify the configurations and a request to certify the baseline configuration in a request queue, wherein the request to certify the baseline configuration is on top of the request queue; and
  generating an instruction for deploying the distributed application stack on the cluster based on a request on top of the request queue.

5. The method of claim 1, wherein the request includes a deviation between the configuration in the request and the baseline configuration of the distributed application stack.

6. The method of claim 1, wherein the certification record further includes at least one of:
  the configuration in the request;
  the baseline configuration; and
  a status for each deployed software artifact.

7. The method of claim 1, wherein each software artifact is stored in a version-controlled package format in a software package repository.

8. A system having at least one processor, storage, and a communication platform connected to a network for automatically certifying a configuration of a distributed application stack, the system comprising:
  a request handler implemented on the processor and configured to receive a request to certify a configuration of a distributed application stack to be deployed on a cluster including a plurality of nodes based on a baseline configuration of the distributed application stack, wherein the configuration of the distributed application stack includes a version of each of a plurality of software artifacts, and the baseline configuration has been provided previously, which can be used to create the configuration specified in the request;
  an instruction generator implemented on the processor and configured to generate an instruction based on the configuration specified in the request for deploying the distributed application stack on the cluster, wherein the instruction associates each of the plurality of software artifacts with a type of the plurality of nodes on which the respective software artifact is to be deployed;
  a deployment unit implemented on the processor, operatively coupled to the request handler, and configure to deploy the distributed application stack on the cluster in accordance with the instruction;
  a recording module implemented on the processor and configured to receive a record from each node of the cluster indicating one or more of the plurality of software artifacts with a respective status of the deployment and a result after the deployment of each of the one or more of the plurality of software artifacts with respect to the respective node in the cluster; and
  a certification generator implemented on the processor, operatively coupled to the record unit, and configured to create a certification record for the configuration specified in the request based on the received records from the plurality of nodes in the cluster, wherein the certification record includes a description of the configuration of the distributed application stack deployed on the nodes of the cluster and a result for each software artifact after the deployment.

9. The system of claim 8, further comprising
  a version correction module operatively coupled to the request handler, configured to, in response to a change of the version of at least one software artifact in the distributed application stack, identify a certified configuration that includes the at least one software artifact with the changed version, wherein the deployment unit is further configured to deploy the distributed application stack on the cluster based on the identified configuration that includes the at least one software artifact with the changed version; and the certification generator is further configured to create an updated certification record for the identified configuration.

10. The system of claim 8, further comprising a baseline configuration retrieval module operatively coupled to the request handler, configured to obtain the baseline configuration of the distributed application stack, wherein the deployment unit is further configured to deploy the distributed application stack on the cluster based on the baseline configuration; and the certification generator is further configured to:

create a certification record for the baseline configuration based on a status of the deployment and/or a result after the deployment for each node, and store, in a record repository, the certification record for the configuration in the request and the certification record for the baseline configuration.

11. The system of claim 8, wherein the request handler is further configured to:

receive a plurality of requests to certify a plurality of configurations of the distributed application stack based on the baseline configuration of the distributed application stack;

store the plurality of requests to certify the configurations and a request to certify the baseline configuration in a request queue, wherein the request to certify the baseline configuration is on top of the request queue; and generate an instruction for deploying the distributed application stack on the cluster based on a request on top of the request queue.

12. The system of claim 8, wherein the request includes a deviation between the configuration in the request and the baseline configuration of the distributed application stack.

13. The system of claim 8, wherein the certification record further includes at least one of:

the configuration in the request;
the baseline configuration; and
a status for each deployed software artifact.

14. The system of claim 8, wherein each software artifact is stored in a version-controlled package format in a software package repository.

15. A non-transitory machine-readable medium having information recorded thereon for automatically certifying a configuration of a distributed application stack, wherein the information, when read by the machine, causes the machine to perform the following:

receiving a request to certify a configuration of a distributed application stack to be deployed on a cluster including a plurality of nodes based on a baseline configuration of the distributed application stack, wherein the configuration of the distributed application stack includes a version of each of a plurality of software artifacts, and the baseline configuration has been provided previously, which can be used to create the configuration specified in the request;

generating an instruction based on the configuration specified in the request for deploying the distributed application stack on the cluster, wherein the instruction associates each of the plurality of software artifacts with a type of the plurality of nodes on which the respective software artifact is to be deployed;

deploying the distributed application stack on the cluster in accordance with the instruction;

receiving a record from each node of the cluster indicating one or more of the plurality of software artifacts with a respective status of the deployment and a result after the deployment of each of the one or more of the plurality of software artifacts with respect to the respective node in the cluster; and creating a certification record for the configuration specified in the request based on the received records from the plurality of nodes in the cluster, wherein the certification record includes a description of the configuration of the distributed application stack deployed on the nodes of the cluster and a result for each software artifact after the deployment.

16. The medium of claim 15, further comprising:

in response to a change of the version of at least one software artifact in the distributed application stack, identifying a certified configuration that includes the at least one software artifact with the changed version;

deploying the distributed application stack on the cluster based on the identified configuration that includes the at least one software artifact with the changed version; and creating an updated certification record for the identified configuration.

17. The medium of claim 15, further comprising:

obtaining the baseline configuration of the distributed application stack;

deploying the distributed application stack on the cluster based on the baseline configuration;

creating a certification record for the baseline configuration based on a status of the deployment and/or a result after the deployment for each node; and storing, in a record repository, the certification record for the configuration in the request and the certification record for the baseline configuration.

18. The medium of claim 15, wherein the step of receiving a request comprising:

receiving a plurality of requests to certify a plurality of configurations of the distributed application stack based on the baseline configuration of the distributed application stack;

storing the plurality of requests to certify the configurations and a request to certify the baseline configuration in a request queue, wherein the request to certify the baseline configuration is on top of the request queue; and generating an instruction for deploying the distributed application stack on the cluster based on a request on top of the request queue.

19. The medium of claim 15, wherein the request includes a deviation between the configuration in the request and the baseline configuration of the distributed application stack.

20. The medium of claim 15, wherein the certification record further includes at least one of:

the configuration in the request;
the baseline configuration; and
a status for each deployed software artifact.

21. The medium of claim 15, wherein each software artifact is stored in a version-controlled package format in a software package repository.

22. The method of claim 1, wherein the baseline configuration is in a form of a XML file or a text file.

23. The method of claim 1, wherein receiving a request to certify the configuration of the distributed application stack comprises:
creating a plurality of request queues, each of which including a set of requests to certify a set of configurations and a request to certify a corresponding baseline configuration on which the set of configurations are generated based; and
receiving a new request to certify a new configuration based on one of the baseline configurations; and
assigning the new request to one of the plurality of request queues based on the corresponding baseline configuration.

* * * * *